United States Patent [19]

Loizeau

[11] Patent Number: 4,800,996
[45] Date of Patent: Jan. 31, 1989

[54] CLUTCH UNIT FOR MOTOR VEHICLE

[75] Inventor: Pierre Loizeau, Ville d'Avray, France

[73] Assignee: Valeo, Paris, France

[21] Appl. No.: 81,738

[22] Filed: Aug. 5, 1987

[30] Foreign Application Priority Data

Aug. 6, 1986 [FR] France .................. 86 11391

[51] Int. Cl.4 ............... F16D 3/50; F16D 47/02
[52] U.S. Cl. ................. 192/106.1; 192/3.21; 192/3.31; 192/103 B; 192/105 BA; 464/81; 464/85
[58] Field of Search .............. 192/70.17, 106.1, 3.21, 192/3.31, 103 B, 105 BA, 48.3; 464/81, 85

[56] References Cited

U.S. PATENT DOCUMENTS

| | | | |
|---|---|---|---|
| 1,610,794 | 12/1926 | Keller | 192/41 |
| 1,935,459 | 11/1933 | Ryan et al. | 192/48.3 |
| 2,105,188 | 1/1938 | Guy | 192/70.17 |
| 2,283,325 | 5/1942 | Fawick | 192/105 BA |
| 2,597,380 | 5/1952 | Root | 192/106.1 X |
| 2,852,117 | 9/1958 | Sproul | 192/105 BA |
| 2,901,075 | 8/1959 | Kiekhaefer | 192/105 BA |
| 3,565,224 | 2/1971 | Argereu | 192/105 BA |
| 4,037,691 | 7/1977 | Ivey | 192/3.31 |
| 4,117,918 | 10/1978 | Silberschlag | 192/103 B |
| 4,296,854 | 10/1981 | Staub | 192/106.1 |
| 4,300,363 | 11/1981 | Mathues | 192/106.1 X |
| 4,465,172 | 8/1984 | Gatewood | 192/106.2 |
| 4,488,629 | 12/1984 | Loizeau | 192/106.1 |
| 4,681,199 | 7/1987 | Maucher et al. | 192/48.3 X |

FOREIGN PATENT DOCUMENTS

| | | | |
|---|---|---|---|
| 1086557 | 2/1955 | France . | |
| 1445551 | 6/1966 | France . | |
| 0114036 | 7/1982 | Japan | 192/106.1 |
| 0226754 | 12/1984 | Japan | 192/3.31 |
| 611190 | 10/1948 | United Kingdom | 192/105 BA |

Primary Examiner—Rodney H. Bonck
Attorney, Agent, or Firm—Charles E. Brown; Charles A. Brown

[57] ABSTRACT

A clutch unit is disclosed for rotatably connecting two coaxial parts mounted for relative rotation. The clutch unit comprises a circular track on one part and at least one self-clamping cam on the other part bearing on a second track carried by the other part. The self-clamping cam comprises a roller having a roller surface and mounted for eccentric rotation about a pin having an outer periphery defining the second track. The roller surface is clampingly engageable with the first track to define an engaged position of the clutch unit. The pin is carried by a radially elastically deformable arm.

5 Claims, 6 Drawing Sheets

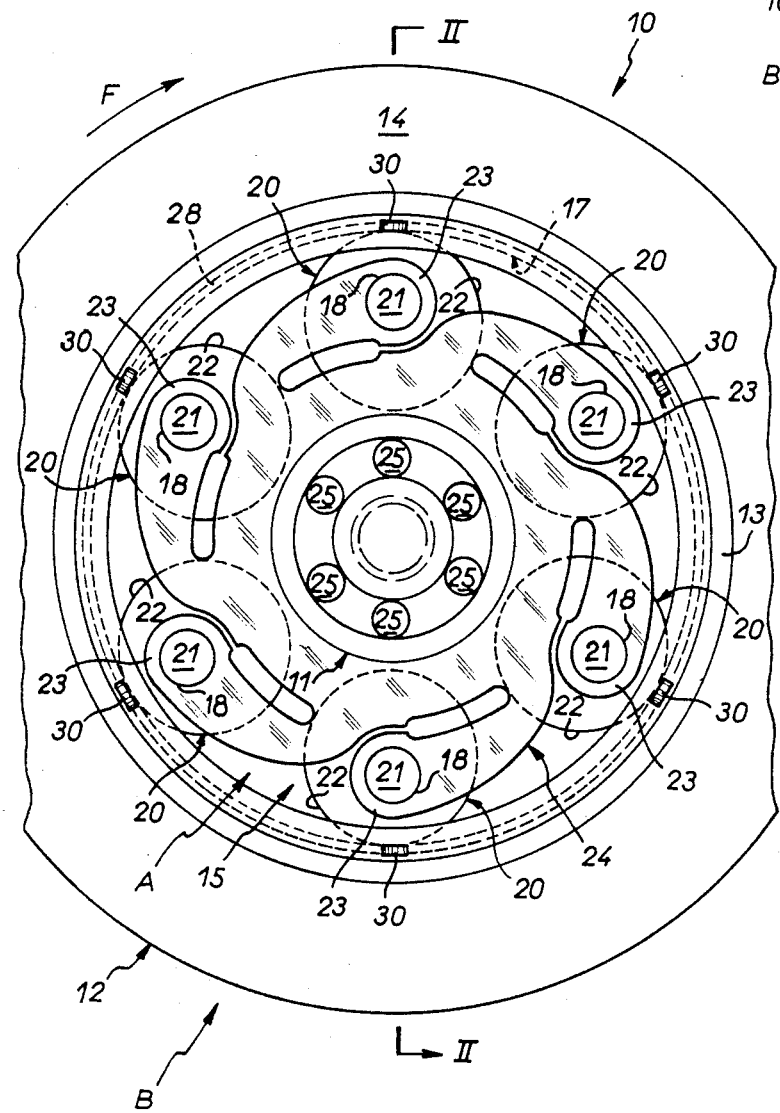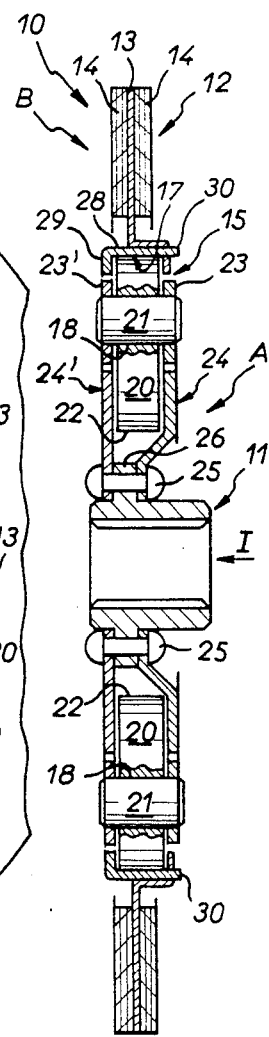

FIG.12
FIG.13
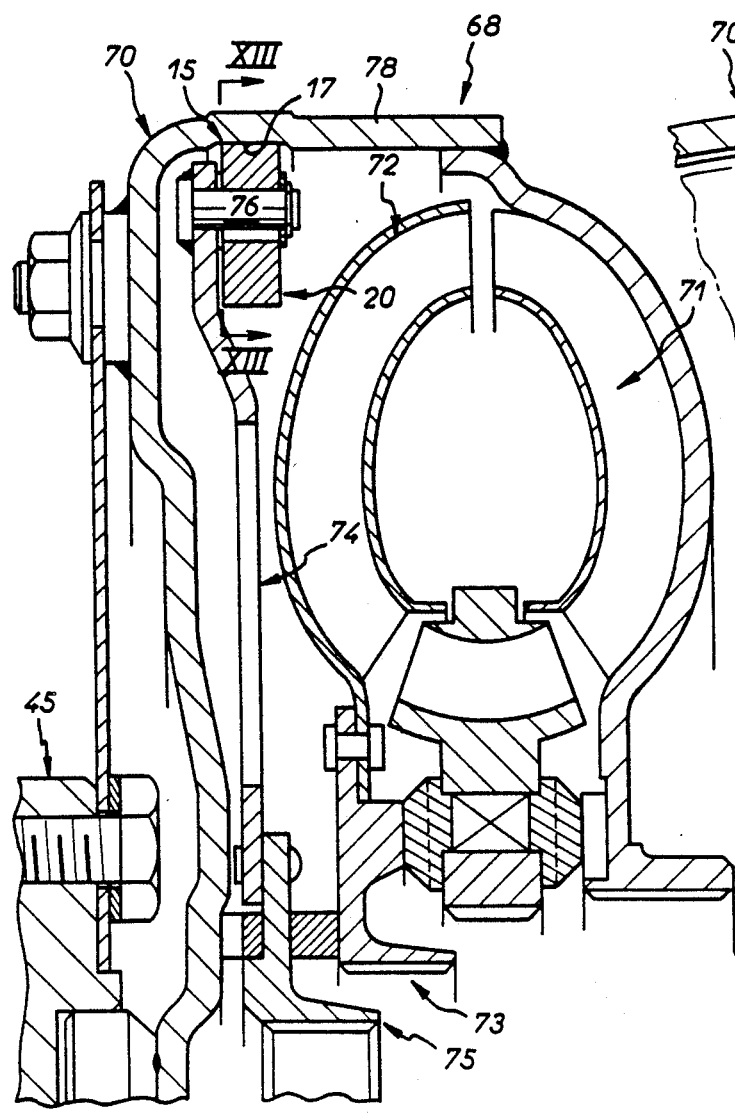
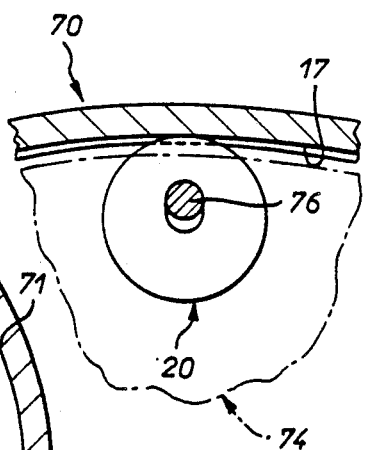

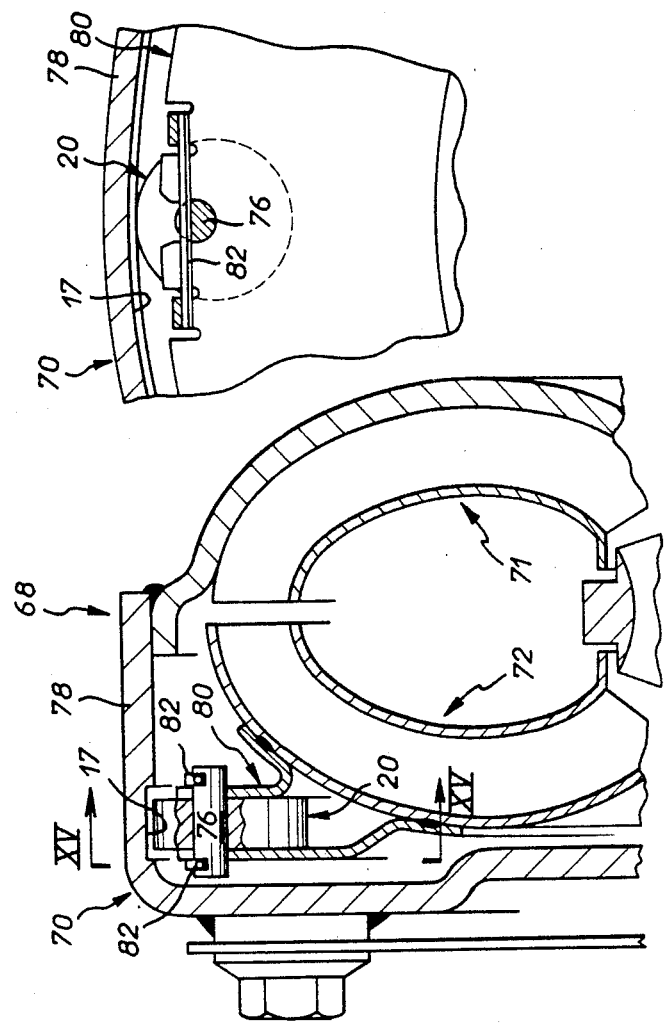

CLUTCH UNIT FOR MOTOR VEHICLE

BACKGROUND TO THE INVENTION

1. Field of the Invention

The present invention relates, in general terms, to clutches, that is to say mechanical devices to be put to use between two coaxial parts mounted so as to rotate relative to one another, in order, as required, to make either a connection between these two parts in terms of rotation or a break between them.

It is concerned more particularly, but not necessarily exclusively with the equipping of motor vehicles.

2. Description of the Related Art

In such a case, there can be either an actual clutch, that is to say the device to be interposed between the output shaft of the engine and the axle shafts when the corresponding transmission is a mechanical transmission, or a simple clutch unit of the type which, when this transmission is a hydraulic transmission, is used within the corresponding hydraulic coupling member, in order, for example, to ensure, under certain transmission conditions, a direct engagement between the shafts in question, deactivating such a hydraulic coupling member, or a direct connection between the housing of the latter and its turbine wheel.

Where an actual clutch for mechanical transmission is concerned, as is known such a clutch comprises substantially a first plate, or reaction plate, which is intended to be fixed in terms of rotation to a first shaft, generally a driving shaft, and in practice the output shaft of the engine in respect of the equipment of a motor vehicle, a clutch plate assembly with a friction disc and hub, intended to be fixed in terms of rotation by means of the said hub to a second shaft, generally a driven shaft, and in practice the input shaft of the gearbox in respect of such equipment, a cover which is fixed in terms of rotation to the reaction plate, a second plate or pressure plate, and axially acting elastic means which, bearing on the cover, are designed to stress the pressure plate in the direction of the reaction plate, in order to clamp the friction disc of the clutch plate assembly and thus engage the unit as a whole.

Within such a clutch, in practice the friction disc of the clutch plate assembly forms the actual clutch unit and torque is transmitted between the driving shaft and the driven shaft as a result of friction by means of this friction disc, and more specifically friction linings which it possesses for this purpose.

Most often, a clutch thus has only a single clutch unit, and because of its construction there is never any slip in the region of the latter, apart from the transient conditions prevailing during engagement or disengagement, and for this purpose the maximum torque which it is capable of transmitting without slip is deliberately selected higher, bearing in mind a reasonable safety coefficient, than the maximum engine torque.

This clutch is likewise usually employed to ensure filtering of the vibrations which may arise over the entire length of the kinematic chain formed by the transmission on which it is placed.

In practice, to achieve this, a torsion-damping device is arranged there.

Most often, this torsion-damping device is incorporated in the clutch plate assembly between its friction disc and its hub.

However, alternatively or in addition, there has already also been a proposal to incorporate such a torsion-damping device in the reaction plate.

At all events, hitherto such a torsion-damping device has conventionally used, between two coaxial parts mounted so as to rotate relative to one another, on the one hand, circumferentially acting elastic means and, on the other hand, for the desired damping, friction means.

This arrangement has been and still is satisfactory, at least for some uses.

However, it has the following disadvantages.

First of all, it virtually unavoidably generates noise.

In particular, there are the noises called neutral noises, that is to say the noises which, with the gearbox in neutral, are attributable to knocking between the pinions of such a gearbox under the stress of the cyclic irregularities of the engine and the angular oscillations resulting from these in the component parts of the torsion-damping device used.

There are also the noises called "clunk" noises, that is to say the noises which occur, for example, when the vehicle driver more or less abruptly releases the depressing action which he previously exerted on the vehicle accelerator, the mode of operation of the unit as a whole then changing from the type called "traction" in which the engine torque outweighs the resistant torque, to the type called "on the overrun" corresponding to operating conditions which are the opposite of the preceding one.

In fact, since the circumferentially acting elastic means contained in the torsion-damping device used are saturated very quickly, each time this results in a virtually instantaneous and therefore noisy tilting of one of the component parts of this damping device in relation to the other, this tilting corresponding to a relative bearing change from one circumferential direction to the other between the said parts, the relative angular movement between these inevitably being limited, each time with compensation of the mechanical play existing downstream in the transmission in question, and especially in the bridge which the latter normally possesses.

This "clunking" noise, which also arises when a new depressing action is exerted on the accelerator, is especially noticeable when the vehicle is driven in a slow-moving line, that is to say when, as can happen, for example, in town traffic, the speed of this vehicle is low, for example near the normal idling speed of the engine, and when, in conjunction with this, the torque required from the latter is also low, engines equipping some vehicles at the present time being designed, in fact, so that they are capable of accepting such operating conditions in order to minimize consumption.

Moreover, it can be accompanied by rocking which, when transmitted to the engine and from this to the body of the vehicle in question, can give rise in this body, especially when the engine is arranged transversely relative to this, to an oscillatory movement, commonly called a "knocking" movement which reflects that to which the two component parts of the torsion-damping device in question are then subjected and which can give the driver of such a vehicle an unpleasant feeling.

SUMMARY

The subject of the present invention is, in general terms, an arrangement making it possible to minimize or even eliminate these disadvantages.

In its most general form, the invention provides a clutch unit for the disengageable connection in terms of rotation between two coaxial parts mounted so as to rotate relative to one another, which comprises a first track which is fixed in terms of rotation with one of the said parts and extends circularly about the axis of the unit as a whole, and at least one self-clamping cam carried by the other of the said parts and bearing on a second track supported on said other part; the self-clamping cam being wedgingly cooperable with the said first track and at least one of the elements formed by the said tracks and the said self-clamping cam having a capacity for elastic deformation substantially radially.

In practice, there is provided a plurality of self-clamping cams which are suitably distributed circularly about the axis of the unit as a whole.

For example, according to a particular embodiment, such a self-clamping cam consists of a roller which, mounted so as to rotate in an eccentric manner about a pin forming the second track, that is to say that on which it bears, is designed to bear by means of its rolling strip against the first track, that is to say that with which it is to interact by wedging.

At all events, the arrangement according to the invention causes wedging to occur, this wedging following a slip.

This results, in particular, in a virtually complete suppression of the neutral noises.

In fact, in neutral, in practice there is no driving of the two component parts of the clutch unit according to the invention relative to one another.

This is all the more so because, according to a particular embodiment of the invention, the self-clamping cams necessary for such a drive in rotation are, at rest, radially at a distance from the track with which they are to interact by wedging to ensure this, the said self-clamping cams coming in contact with this track only under the stress of the centrifugal force when the rotational speed of the unit as a whole is sufficient.

The arrangement according to the invention also makes it possible to minimize or even eliminate completely the "clunking" noise and the "knocking" movement.

In fact, when the torque is reversed, there is no longer any development of a series of oscillations between the two rotary parts in question, namely those forming the clutch unit according to the invention, but simply, at worst, the occurrence of a half-oscillation with a substantial elongation of the corresponding period.

This is all the more so because, since there is no limitation on the angular movement between these two rotary parts, in practice this angular movement can extend over a considerable portion of the circumference, indeed even over one or more revolutions, and the compensation of the mechanical play in the transmission in question then takes place within the unit according to the invention itself and not downstream of this.

A clutch unit according to the invention can be used in isolation, for example within a hydraulic coupling member, when the transmission in question is a hydraulic transmission.

However, it can also be used within a clutch of the type to be inserted in a mechanical transmission.

The subject of the present invention is also a clutch which in this way contains such a clutch unit with a self-clamping cam or self-clamping cams.

For example, this clutch unit with a self-clamping cam or self-clamping cams can belong to its clutch plate assembly by being placed between the hub and the friction disc of the latter.

Alternatively, it can belong to its reaction plate, the said reaction plate then being formed from two coaxial parts mounted so as to rotate relative to one another, the clutch unit with a self-clamping cam or self-clamping cams used being interposed between these.

At all events, and according to one characteristic of the invention, the clutch equipped in this way then comprises, in series, two clutch units, namely the clutch unit formed in the conventional way by the friction disc of its clutch plate assembly, and the clutch unit with a self-clamping cam or self-clamping cams according to the invention.

Of course, the positive drive effect of the wedging which is characteristic of the invention is a function of the torque.

In practice, and as already emphasized above, in fact this positive drive can take effect only after a considerable angular movement between the two rotary parts in question, and this angular movement can extend over an appreciable portion of the circumference, indeed even over one or more revolutions.

The overall result of this is a more progressive starting.

Finally, another subject of the present invention is a hydraulic coupling member which possesses a clutch unit with a self-clamping cam or self-clamping cams according to the invention, either to ensure direct engagement between its housing and a hub or to ensure that this housing is fixed in terms of rotation to its turbine wheel.

BRIEF DESCRIPTION OF THE DRAWINGS

FIG. 1 is a partial elevation view of a clutch plate assembly using a clutch unit with a self-clamping cam or self-clamping cams according to the invention;

FIG. 2 is a view in axial section of this clutch plate assembly along the line II—II of FIG. 1;

FIG. 12 is a partial view in axial section of a hydraulic coupling member using a clutch unit with a self-clamping cam or self-clamping cams according to the invention;

FIG. 12 is a partial view in elevation and cross-section of this hydraulic coupling member along the line XIII—XIII of FIG. 12;

FIGS. 14 and 15 are partial views of an alternative embodiment which are respectively similar to those of FIGS. 12 and 13.

DESCRIPTION OF THE PREFERRED EMBODIMENTS

Figure 3:
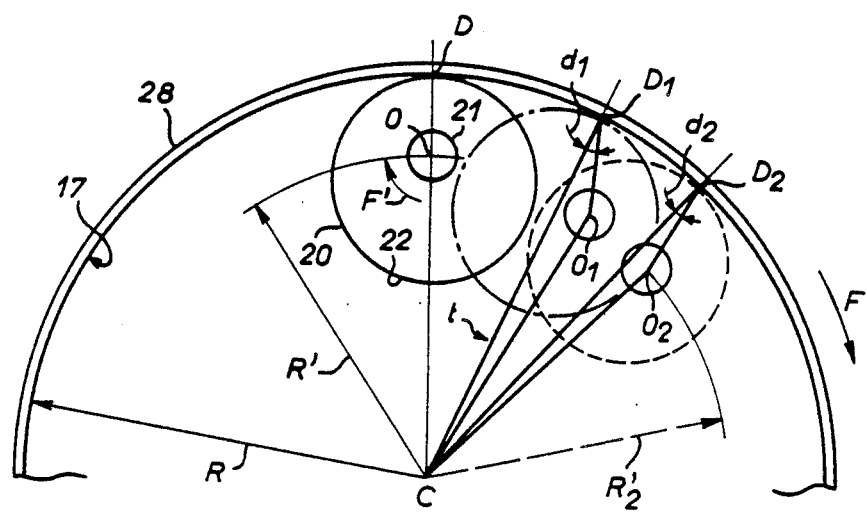
FIG. 3 is a diagrammatic view which, based on that of FIG. 1, illustrates the operation of the clutch unit with a self-clamping cam or self-clamping cams according to the invention.

FIGS. 1 to 6 illustrate, by way of example, the use of the invention on a clutch plate assembly 10.

Such a clutch plate assembly 10 substantially comprises two co-axial parts A, B, one axial and the other peripheral, which are mounted so as to rotate relative to one another.

The axial part A possesses axially a hub 11 which, for example by means of a fastening with splines, as shown, is designed to fix the unit as a whole in terms of rotation to a shaft, usually a driven shaft (not shown).

The peripheral part B comprises, peripherally, a friction disc 12, itself formed from an annular web 13 circularly continuous or divided into separate blades, and from two friction linings 14 each arranged respectively on either side of this web 13 and being suitably connected to the latter in terms of rotation, either with an elastic capacity for axial movement relative to this web 13 or, as shown, without such a capacity for axial movement, by means of which friction disc 12, as a result of clamping between two plates, as will be described in more detail later, the unit as a whole is designed to be fixed in terms of rotation, as a result of friction, to a second shaft, in practice a driving shaft, likewise not shown.

These arrangements are well known per se, and since they are not themselves part of the present invention they will not be described in any more detail here.

According to the invention, a clutch unit 15 is provided between the parts A, B which thus form such a clutch plate assembly 10 and therefore between the hub 11 and the friction disc 12 of the latter.

According to the invention, this clutch unit 15, which therefore takes effect between two coaxial parts A, B mounted so as to rotate relative to one another to make a disengageable connection in terms of rotation between these, in general terms, comprises a first track 17 which, integral in terms of rotation with one of the said parts, in practice the peripheral part B, extends circularly about the axis of the unit as a whole, and, carried by the other of the said parts, and consequently the axial part A, bearing on a second track 18 belonging to this, at least one cam 20, called a self-clamping cam here for the sake of convenience, which is designed to interact by wedging with the said first track 17, with, substantially radially, a capacity for elastic deformation in respect of at least one of the elements formed by the said tracks 17 and 18 and the said self-clamping cam 20.

In practice, the clutch unit 15 possesses a plurality of self-clamping cams 20 distributed circularly about the axis of the unit as a whole.

In the embodiments illustrated in FIGS. 1 to 6, six self-clamping cams 20 uniformly distributed circularly are provided in this way.

In the embodiment shown more particularly in FIGS. 1 to 3, each of the self-clamping cams 20 used consists of a cylindrical roller which, mounted so as to rotate in an eccentric manner about a pin 21 which, by means of its outer periphery, forms the track 18 on which it bears, is designed to bear by means of its outer rolling surface or strip 22 against the track 17 with which it is to interact by wedging.

The pin 21 thus carrying the roller &forming each of the self-clamping cams 20 is itself carried by at least one arm elastically deformable radially 23, thus resulting in a capacity for elastic radial deformation in respect of the track 18 formed by such a pin 21.

In practice, this pin 21 extends parallel to the axis of the unit as a whole between two arms elastically deformable radially 23, 23', and these each belong respectively to two flanges 24, 24' which extend transversely relative to the said axis of the unit as a whole and from which the arms elastically deformable radially are each respectively cut out in one piece.

In practice, these arms elastically deformable radially 23, 23' extend substantially circumferentially and are cantilevered from an anchoring zone, by means of which they are secured to the flanges 24, 24' to which they belong, all pointing circumferentially in the same direction, and the said flanges 24, 24' are fixed in terms of rotation, by means of rivets 25, to the hub 11 of the axial part A, the said hub 11 having an annular collar 26 projecting radially from it for this purpose.

Of course, from one flange 24, 24' to the other, the arms elastically deformable radially 23, 23' which carry one and the same pin 21 correspond axially to one another.

In the embodiment illustrated in FIGS. 1 to 3 the friction disc 12 of the peripheral part B is carried by a cylindrical hoop 28 which surrounds all the rollers forming the self-clamping cams 20, at the same time forming, by means of its inner surface, the track 17 with which the latter are intended to interact by wedging, and which is keyed axially on the said rollers for the axial retention of the said friction disc 12.

For this purpose, this hoop 28 has, at one of its ends, a turned-down edge 29 projecting radially in the direction of the axis of the unit as a whole, and, at its other end, it is extended axially, from place to place, by means of lugs 30 which, in order to fasten the friction disc 12, pass through the web 13 of the latter via orifices provided for this purpose in this web, and which, beyond this, are, for example, hammered or crimped in a suitable way, so that the part of the said web 13 which extends radially in the direction of the axis of the unit as a whole beyond the said lugs 30 forms, together with the preceding turned-down edge 29, a yoke which laterally and on either side surrounds the rollers forming the self-clamping cams 20.

Preferably, and as illustrated, the web 13 of the friction disc 12 is bent in practice, so that, in its running part, namely that carrying the friction linings 14, it extends substantially in the transverse mid-plane of the rollers forming the self-clamping cams 20.

In practice, in the embodiment shown in FIGS. 1 to 3, the hoop 28 is made of rigid material, for example steel.

The same can be true of the rollers forming the self-clamping cams 20.

In this case, as mentioned above, the sole capacity for elastic deformation within the clutch unit 15 according to the invention is attributable to the arms elastically deformable radially 23, 23' which carry the pins 21 of these rollers.

However, alternatively, the latter can also have a certain elastic capacity.

They can likewise be made of a material of the type conventionally used for producing friction linings.

At all events, by virtue of construction, and under the the stress of the elastically deformable arms 23, 23' carrying them, at rest the rollers forming the self-clamping cams 20 are in contact, along a generatrix of their rolling strip 22, which the track 17 formed by the inner surface of the hoop 28 belonging to the peripheral part B.

Let R be the radius of this track 17 and let C be its centre (FIG. 3).

Also, in this FIG. 3, let 0 be the centre of the pin 21 of any one of the rollers forming the self-clamping cams 20, chosen as an example.

At rest, the points C and 0 are aligned with the point of contact D of this roller with the track 17, and the point 0 is on a circumference of maximum radius R', the eccentric part of the rollers forming the self-clamping cams 20 then extends in the direction of the axis of the unit as a whole, counting from such a point 0.

It will be assumed that, during operation, and as is customary, the peripheral part B of the clutch plate assembly 10 in question forms the driving part of the latter.

In practice, it then rotates in the same circumferential direction as that in which the arms elastically deformable radially 23, 23' of the axial part A extend, as indicated by the arrow F in FIGS. 1 and 3.

As a result of friction, the hoop 28 belonging to the peripheral part B tends to drive the rollers forming the self-clamping cams 20.

It therefore causes these to rotate about their pin 21 according to the arrow F' of FIG. 3.

The result of this rotation is that the center 0 of such a pin 21 approaches the centre C of the track 17, and the arms elastically deformable radially 23, 23' which carry it are consequently elastically deformed radially in the direction of the axis of the unit as a whole.

In conjunction with this, the center 0 of such a pin 21 shifts downstream relative to the straight line CD, and the points OCD, which in fact have become $O_1CD_1$ in respect of a first position, explained below, or $O_2CD_2$ in respect of a second position, also explained below, from then on form a triangle t.

Let $d_1$ or $d_2$ be the angle formed by the sides $O_1D_1$ or $O_2D_2$, on the one hand, and $CD_1$ or $CD_2$, on the other hand, of this triangle t at the contact of the rollers forming the self-clamping cams 20 with the track 17.

In a first stage, these rollers simply roll, without slipping, on the track 17 under a radial load which increases in proportion to the increasing elastic deformation of the corresponding arms elastically deformable radially 23, 23'.

The driving by the peripheral part B of the axial part A carrying the rollers forming the self-clamping cams 20 thus results from the frictional rolling torque which is then generated between the rollers and the hoop 28 and to which is added the frictional sliding torque generated in consequence between the said rollers and the pins 21 carrying them, since they rotate about these.

In practice, this first phase, or rolling phase, can extend over a relatively wide angular range, that is to say can correspond to a relatively large angular movement, for example of the order of 12° more or less, between the component parts A, B of the clutch plate assembly 10 in question.

In conjunction with this, the torque transmitted from one of its parts to the other remains low.

Where the equipment of a motor vehicle is concerned, this advantageously results in a virtual disappearance of the neutral noises.

When the torque is reversed, this also results in a disappearance of the "clunking" noises, and the transmission play causing these noises can then be compensated for within the clutch plate assembly itself and not downstream of the latter, as is customary.

During this first rolling phase, the distance between the center 0 of the axis 21 of the rollers forming the self-clamping cams 20 and the corresponding straight line CD, which first increases, can subsequently decrease, this center 0 then tending once again to come into line with the points CD, to ensure a radial orientation of the eccentricity of these rollers in the opposite direction to its initial orientation, the eccentric part of these rollers then extending in the opposite direction to the axis of the unit as a whole, counting from such a center 0.

But at all events, and by virtue of the construction, the distance between this center 0 and the track 17 increases continuously, and in practice the desired wedging occurs before such a realignment of the center 0 with the points CD.

In a position $O_1$ of the center 0, a sliding friction is added to the corresponding rolling friction of the point $D_1$.

A second sliding/rolling phase begins from that moment between the hoop 28 and the rollers forming the self-clamping cams 20, and during this, the contact friction increases and consequently also the torque transmitted from the peripheral part B to the axial part A.

This second sliding/rolling phase continues until the desired wedging occurs between the rollers forming the self-clamping cams 20 and the track 17 made by the inner surface of the hoop 28.

The center 0, in fact $O_1$, of the pins 21 of these rollers is then located on a circumference of minimum radius $R'_2$.

It was assumed, in the foregoing, that the mode of operation was by "traction" operation, the engine torque outweighing the resistant torque.

For an operating mode "on the overrun", the resistant torque outweighing the engine torque, a reverse process simply takes place.

In the foregoing, for the purpose of the desired wedging process, only the arms 23, 23' carrying the pins 21 of the rollers forming the self-clamping cams 20 are elastically deformable radially, and therefore so is the "track" 18, on which these self-clamping cams 20 bear, this track 18 being formed by the peripheral surface of the pins 21 in question.

However, the same wedging process can be obtained if, in substitution for this capacity for elastic deformation of the arms elastically deformable radially 23, 23', and/or in addition to this, the rollers forming the self-clamping cams 20 are themselves also elastically deformable radially, either with their rolling strip 22 itself being made of elastic material or, this rolling strip 22 being made of rigid material, with a lining of elastic material interposed between it and the corresponding pin 21, and/or if the track 17, with which these rollers are to interact by wedging, is itself elastically deformable radially, either with this track 17 being formed by a hoop 28 made of elastic material or, this hoop 28 being made of rigid material, as described above, with it being connected to the peripheral part B carrying it, by elastic means, and for example by arms elastically deformable radially of that type of arm which is elastically deformable radially 23, 23'.

Briefly, it is sufficient if at least one of the sides of the triangle which are capable of forming between them the center C of the track 17, the center 0 of the pin 21 of the rollers forming the self-clamping cams 20 and the point of contact D of such a roller with such a track 17, is elastically deformable.

Figure 5:
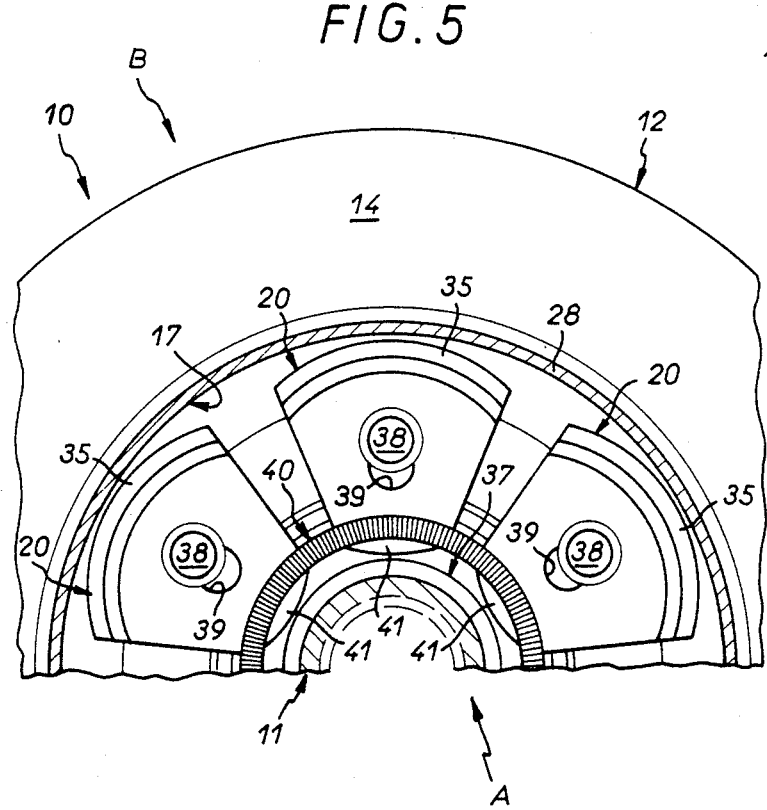
FIG. 5 is a partial view in elevation and cross-section of this alternative embodiment along the broken line V—V of FIG. 4, showing the configuration of the rest of the clutch unit with a self-clamping cam or self-clamping cams which it possesses.
Figure 4:
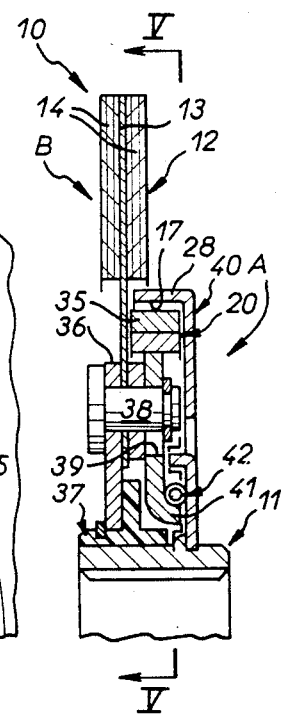
FIG. 4 is a half-view in axial section, similar to that of FIG. 2, of an alternative embodiment.
Figure 6:
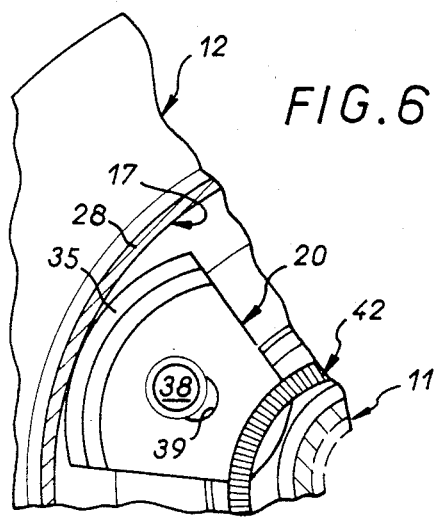
FIG. 6 is a partial view, similar to that of FIG. 5, of an operating configuration of this clutch unit with a self-clamping cam or self-clamping cams.

For example, in the alternative embodiment illustrated in FIGS. 4 to 6, the self-clamping cams 20 consist of rollers, of which the periphery, namely that via which they are intended to interact by wedging with the track 17, is equipped with a covering of elastic material 35.

In practice, in this alternative embodiment, the self-clamping cams 20 then belong to the peripheral part B of the clutch plate assembly 10 in question, namely that also having the friction disc 12, the said friction disc 12 being attached to a flange 36 which, by means of a bearing 37, is mounted so as to pivot freely about the hub 11 and which carries axially pins 38, on which the said self-clamping cams 20 are each respectively mounted slidably and pivotably by means of a slot 39.

Jointly with this, in this alternative embodiment, the hoop 28, the inner surface of which forms the track 17, belongs to the axial part A of the clutch plate assembly 10 in question, this hoop 28 being carried by a transverse flange 40 which extends on the other side of the self-clamping cams 20 relative to the preceding flange 36 and which is itself fixed in terms of rotation to the hub 11, being suitably attached to the latter for this purpose.

Finally, in this embodiment, the self-clamping cams 20 are subjected to elastic restoring means which, in respect of the position of rest of the unit as a whole, keep them at a distance from the track 17 with which they are to interact by wedging.

In practice, in the embodiment illustrated, there is a ring elastically deformable radially 42, on which the self-clamping cams 20 are each hooked by means of a nose 41 which they each have projecting axially from them for this purpose at their radially innermost end in relation to the axis of the unit as a whole.

The operation of this alternative embodiment is similar to that described above.

However, because of the ring elastically deformable radially 42, the self-clamping cams 20 take effect only beyond a certain rotational speed for the unit as a whole, when, under the stress of the centrifugal force to which they are subjected, they move counter to this ring elastically deformable radially 42, to make contact with the track 17 via the covering 35 as shown for one of them in FIG. 6.

Until this rotational speed is reached, the axial part A of the clutch plate assembly 10 is not subjected to any drive stress by the peripheral part B, other than that possibly attributable to the bearing 37, of course.

Thus, where the equipment of a motor vehicle is concerned, there is, without any doubt, a complete suppression of the neutral noises.

FIGS. 7 to 11 illustrate the use of the invention on a clutch 43.

In a way known per se, such a clutch 43 comprises a first plate 44, or reaction plate, which is intended to be fixed in terms of rotation to a first shaft, generally a driving shaft, in practice the output shaft 45 or crankshaft of the engine, where the equipment of a motor vehicle is concerned, a clutch plate assembly 10 with a friction disc 12 and hub 11, intended to be fixed in terms of rotation by means of the said hub 11 to a second shaft, generally a driven shaft, and in practice the input shaft 46 of a gearbox where such equipment is concerned, a cover 48 which is fixed in terms of rotation to the reaction plate 44, a second plate 49, and axially acting elastic means, for example a diaphragm 50, as shown, which, bearing on the cover 48, are designed to stress the pressure plate 49 in the direction of the reaction plate 44 in order to clamp the friction disc 12 and thus engage the unit as a whole.

Since these arrangements are well known per se, and are not in themselves the subject of the present invention they will not be described in any more detail here.

Within such a clutch 43, the friction disc 12 forms a clutch unit.

According to the invention, in series with this clutch unit, the clutch 43 has a clutch unit 15 with a self-clamping cam or self-clamping cams 20, for example of that type described above.

Figure 7:
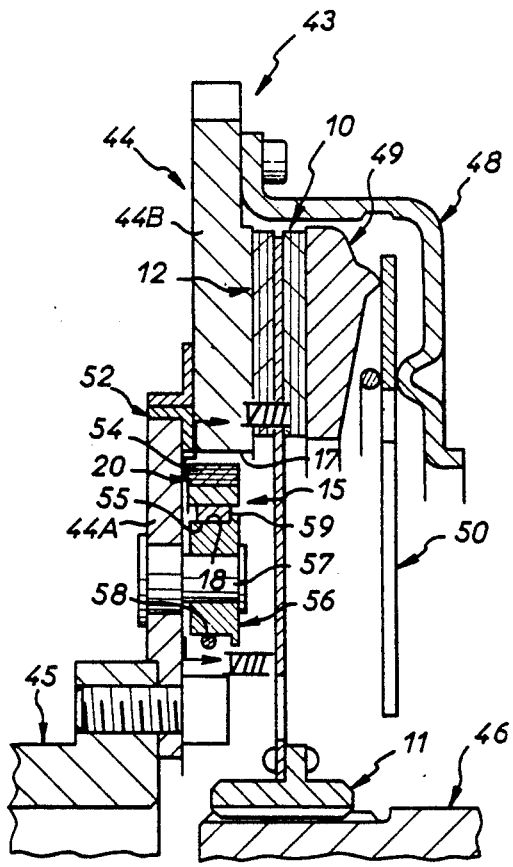
FIG. 7 is a partial view in axial section of a clutch using a clutch unit with a self-clamping cam or self-clamping cams according to the invention.
Figure 8:
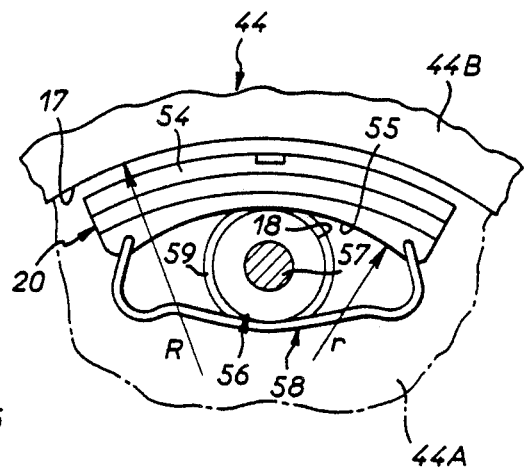
FIG. 8 is a partial view in elevation and crosssection of this clutch along the line VIII—VIII of FIG. 7 showing the configuration of rest of the clutch unit with a self-clamping cam or self-clamping cams which it possesses.
Figure 9:
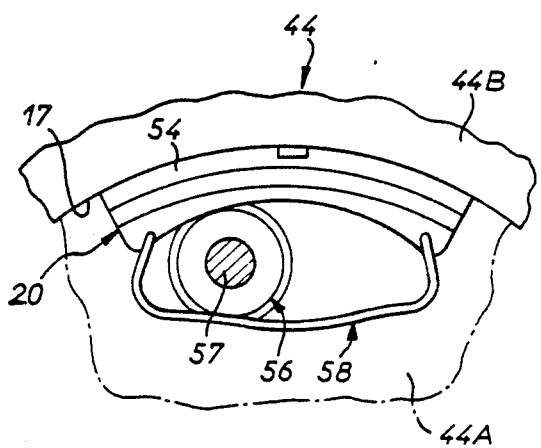
FIG. 9 is a view, similar to that of FIG. 8, of an operating configuration of this clutch unit with a self-clamping cam or self-clamping cams.

In the embodiment illustrated more particularly in FIGS. 7 to 9 this clutch unit 15 belongs to the reaction plate 44, this reaction plate 44 being formed from two co-axial parts 44A, 44B, one axial, the other peripheral, between which it takes effect.

In practice, the parts 44A, 44B which thus form the reaction plate 44 are mounted so as to rotate relative to one another, with a centering bearing 52 interposed, and the first, namely the axial part 44A, is fixed in terms of rotation to the shaft 45, whilst the second, namely the peripheral part 44B, is that to which the cover 48 is attached.

In the embodiment illustrated, the peripheral part 44B forms an annular flange, the radially innermost peripheral edge of which forms the track 17, with which the self-clamping cams 20 are to interact by wedging, and these being carried by the axial part 44A.

In practice, in this embodiment, each of these self-clamping cams 20 consists of a pad which, via a covering 54, and for example a covering of elastic material, present on its radially outermost periphery, is designed to interact by wedging with the track 17, and which, via its radially innermost periphery 55, itself forming a cylindrical track of radius r less than the radius R of the track 17, bears on a roller 56 mounted so as to rotate about a pin 57 carried by the part 44A of the reaction plate 44 projecting axially from it.

The roller 56 which, by means of its rolling strip, forms a track 18 for the pad forming such a self-clamping cam 20 can also be made of elastic material, if desired.

Alternatively, such a pad, carrying a covering of elastic material 54, can also be made of rigid material.

At all events, for its radial retention, each of the pads forming a self-clamping cam 20 is connected to a spring 58 looped round the corresponding roller 56.

This is for example, a wire spring which has a general U-shaped form of which the ends, bent in the form of a hook for this purpose, are connected to the corresponding ends of the pad to which it is assigned.

In conjunction with this, for the axial retention of such a pad, the corresponding roller 56 has a rim 59 projecting radially at its end opposite the reaction plate 44 carrying it.

Preferably, and as shown in FIG. 8, in the position of rest of the unit as a whole, each of the pads thus forming the self-clamping cams 20 is set apart from the track 17 under the stress of the corresponding spring 58.

As in the embodiment of FIGS. 4 to 6, these self-clamping cams 20 therefore take effect, under the stress of the centrifugal force, only beyond a certain rotational speed, as shown in FIG. 9, and a process of the type described previously then takes place.

Figure 10:
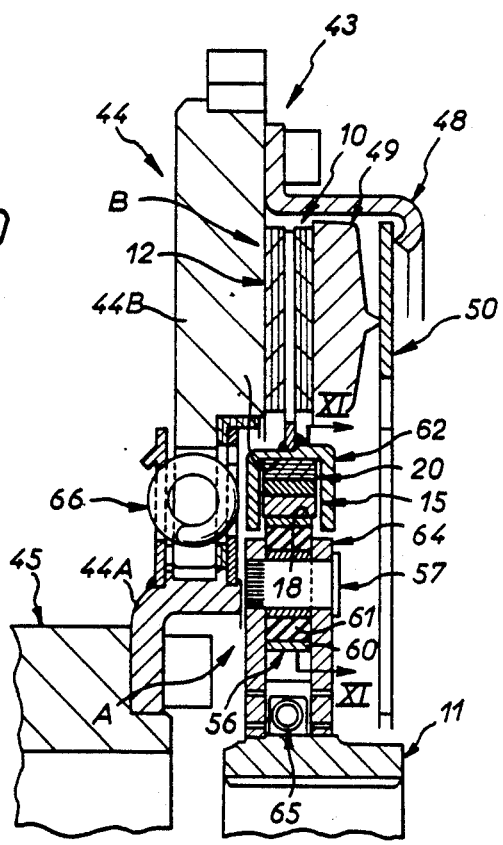
FIGS. 10 and 11 are respectively partial views of an alternative embodiment which are similar to those of FIGS. 7 and 8.
Figure 11:
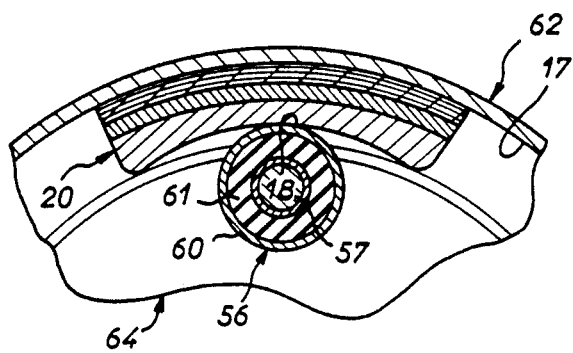

In the alternative embodiment illustrated in FIGS. 10 and 11 the clutch unit 15 with a self-clamping cam or self-clamping cams 20, which the clutch 43 possesses according to be invention, belongs to its clutch plate assembly 10.

The self-clamping cams 20 of this clutch unit 15 can, for example, as shown, be pads of the type described in relation to FIGS. 7 to 9.

However, as can be seen in FIG. 11, in the embodiment illustrated, the rollers 56 forming the track 18 associated with these self-clamping cams 20 are elastically deformable radially, these rollers having a rigid rolling strip 60 and a lining of elastic material 61 interposed between the latter and their pin 57.

In the embodiment illustrated, the friction disc 12 of the clutch plate assembly 10 in question is fixed to a cage 62 which surrounds the pads forming the self-clamping cams 20 and which, by means of its inner cylindrical surface, forms the track 17 with which these are to interact by wedging, the whole forming the peripheral part B of this clutch plate assembly 10, whilst the pins 57 carrying the associated rollers 56 are themselves carried by a cage 64, and between this and the hub 11 a torsion-damping device of conventional type 65, with circumferentially acting elastic means, takes effect, the whole forming the part A of the said clutch plate assembly 10.

Likewise, in the embodiment illustrated, the reaction plate 44, as before, being formed from two coaxial parts 44A, 44B, mounted so as to rotate relative to one another, a torsion-damping device 66 of conventional type is provided between these parts 44A, 44B.

Since such torsion-damping devices with circumferentially acting elastic means are well known per se and are not part of the present invention, they will not be described in any more detail here.

FIGS. 12 to 15 illustrate the use of the invention for a hydraulic coupling member 68 of the type which can be used in hydraulic transmissions for motor vehicles, and for example for those with a so-called automatic gearbox.

Since such a hydraulic coupling member 68 is well known per se, it will not be described in full detail here.

It will be sufficient to mention that it has a housing 70 which is intended to be fixed in terms of rotation to a first shaft, generally a driving shaft, in practice the output shaft 45 or crankshaft of the engine, where the equipment of a motor vehicle is concerned, and to which the blades of an impellor wheel 71 are fixed on the inside.

Opposite this impellor wheel 71 there is a turbine wheel 72, the hub 73 of which is keyed in terms of rotation on a second shaft (not shown) forming a first output shaft for the unit as a whole.

At least for some uses, it is desirable if there is provided a second output shaft in direct engagement with the housing 70.

For this purpose, arranged in this housing 70 is a flange 74 which is carried by another hub 75 designed to fix it in terms of rotation to the second output shaft desired and which is intended to be fixed in terms of rotation to the housing 70 by means of a clutch unit.

According to the invention, the clutch unit used for this purpose is a clutch unit 15 with a self-clamping cam or self-clamping cams 20 of the type described above.

For example, the self-clamping cams 20 used in this way consist of rollers which, carried eccentrically by pins 76 projecting axially from the flange 74 near the periphery of the latter, are mounted so as to rotate on these pins 76, whilst being capable of sliding radially relative to these, and which, by means of their rolling strip, are designed to interact by wedging with a track 17 provided for this purpose on the inner surface of the axial part 78 of the housing 70.

In the embodiment illustrated in FIGS. 14 and 15, there is no direct engagement, as before, but a "lock-up", that is to say fixing the housing 70 and the turbine wheel 72 to one another in terms of rotation.

The rollers forming the self-clamping cams 20 are then carried by a cage 80 fixed to this turbine wheel 72.

In the embodiment illustrated, in respect of the position of rest of the unit as a whole, they are set apart from the track 17 with which they are to interact by wedging, and for this purpose hairpin springs 82 hooked onto the cage 80 carrying them stress their pin 76 in the direction of the axis of the unit as a whole.

Of course, the present invention is not limited to the embodiments described and illustrated, but embraces any alternative form of implementation and/or combination of their various elements.

Nor is its scope of use limited to those uses explained more particularly.

I claim:

1. A clutch unit for rotatably connecting two coaxial parts mounted for relative rotation with respect to each other, the clutch unit comprising a first track fixed for rotation with one of said parts and extending circularly around the axis of the clutch unit, at least one clamping cam carried by the other of said parts and bearing on a second track supported on said other part, said self-clamping cam comprising a roller having an outer roller surface and mounted for eccentric rotation about a pin having an outer periphery forming said second track, said roller surface being clampingly engageable with said first tract for defining an engaged position of the clutch unit, said pin being carried by a radially elastically deformable arm so as to elastically deformably mount the second track relative to the first track.

2. The clutch unit as claimed in claim 1, wherein said other part includes a flange, said arm being anchored to said flange at an anchoring zone and extending circumferentially and in cantilevered fashion from said anchoring zone.

3. The clutch unit as claimed in claim 1, wherein said arm urges said self-clamping cam out of engagement with said first track when said clutch unit is in a rest position.

4. The clutch unit as claimed in claim 2, wherein there are a plurality of said arms spaced from each other and extending in the same circumferential direction.

5. A clutch plate assembly comprising two coaxial parts mounted for relative rotation with respect to each other, one of said parts including an axially extending hub and the other of the parts including a peripherally extending friction disc, the clutch plate assembly comprising a first track fixed for rotation with one of said parts and extending circularly around the axis of the clutch unit, at least one clamping cam carried by the other of said parts and bearing on a second track supported on said other part, said self-clamping cam comprising a roller having an outer roller surface and mounted for eccentric rotation about a pin having an outer periphery forming said second track, said rolling surface being clampingly engageable with said first track for defining an engaged position of the clutch plate assembly, said pin being carried by radially elastically deformable arm so as to elastically deformably mount the second track relative to the first track.

* * * * *